United States Patent [19]

Bender et al.

[11] Patent Number: 5,085,680
[45] Date of Patent: Feb. 4, 1992

[54] DEFORMABLE SIDE SEAL FOR FURNACES AND METHOD FOR USING

[75] Inventors: John E. Bender, Mars; Robert G. Frank, Sarver, both of Pa.

[73] Assignee: PPG Industries, Inc., Pittsburgh, Pa.

[21] Appl. No.: 576,821

[22] Filed: Sep. 4, 1990

[51] Int. Cl.⁵ .......................................... C03B 25/087
[52] U.S. Cl. .................................. 65/118; 65/289; 65/273; 49/482; 414/186; 414/225; 432/242
[58] Field of Search ................. 65/117, 118, 349, 350, 65/273, 268, 289, 95, 160, 182.2, 269, 106; 49/482; 220/211, 344; 414/627, 752, 186, 225; 432/242, 115

[56] References Cited

U.S. PATENT DOCUMENTS

| | | | |
|---|---|---|---|
| 890,252 | 6/1908 | Thompson | 432/242 |
| 2,231,716 | 1/1940 | Hansen | 432/242 |
| 3,934,970 | 1/1976 | McMaster et al. | 65/118 |
| 4,397,672 | 8/1983 | Nitsche | 65/114 |
| 4,407,650 | 10/1983 | Greenler | 432/242 |
| 4,604,124 | 8/1986 | Strauss | 65/273 |
| 4,620,864 | 11/1986 | McMaster | 65/114 |
| 4,666,492 | 5/1987 | Thimons et al. | 65/104 |
| 4,666,496 | 5/1987 | Fecik et al. | 65/273 |
| 4,725,300 | 2/1988 | McMaster | 65/273 |
| 4,823,836 | 4/1989 | Bachmann et al. | 49/91 |
| 4,888,038 | 12/1989 | Herrington et al. | 65/349 |

*Primary Examiner*—Richard V. Fisher
*Assistant Examiner*—John Hoffmann
*Attorney, Agent, or Firm*—Gay Ann Spahn; Andrew C. Siminerio; Donald C. Lepiane

[57] ABSTRACT

A longitudinally extending row of closely spaced elongated flexible springs extend over an elongated slot of a furnace to prevent heat loss. The springs are deflected in turn as an arm moves along the length of the slot and the springs return to their original state after the arm passes by. The arm holds a glass handling device which holds a glass sheet within the furnace. The arm moves along the length of the slot so as to transport the glass sheet through the sections of the heat treating furnace.

14 Claims, 2 Drawing Sheets

DEFORMABLE SIDE SEAL FOR FURNACES AND METHOD FOR USING

FIELD OF THE INVENTION

This invention relates to processing glass sheets within a furnace, and particularly concerns sealing elongated openings in furnace walls that receive means connecting a glass sheet handling device movable within the furnace with shuttle means and/or other control means located outside the furnace and that are operatively connected by connecting means members to the glass sheet handling device to move along said elongated openings with the glass sheet handling device.

BACKGROUND OF THE INVENTION

Glass sheets are heated while conveyed along a horizontally disposed roller conveyor that comprises rolls that rotate in unison to move a series of glass sheets through an enclosed furnace. The conveyor rolls have ends that project outwardly through openings in the furnace housing. These openings are closed as securely as possible by directly engaging the rolls adjacent their ends with insulation to prevent heat loss from the furnace and to prevent relatively cool ambient air from entering the furnace and causing thermal distortion of conveyed glass sheets. The relatively tightly sealed relationship provided by the roll contacting seals also protects the exterior of the furnace from becoming too hot for operator comfort.

In an apparatus for tempering glass sheets, the horizontal conveyor extends through a furnace having exit openings and entrance openings and the flow of air into and out of the furnace has been controlled by incorporating air locks with exit and entrance doors which are opened and closed in an alternating manner to maintain a superatmospheric pressure within the air locks protecting the furnace so as to minimize the loss of hot air from the furnace through the entrance and exit openings. Also, upper and lower sets of compressible rolls separated by approximately the glass sheet thickness have been used to reduce leakage at the entrance and exit openings of furnaces where flat sheets are heated for tempering.

When glass sheets are shaped to complicated shapes and tempered, it is expedient to use a movable vacuum holder within a furnace to support and convey the glass sheet after it has been heated to a processing temperature and while it is conveyed to a shaping station. The holder utilizes shuttle means outside the furnace to control movement of the holder within the furnace and a vacuum source outside the furnace to supply vacuum to the holder through one or more vacuum supply pipes. Frame members connecting the holder to the shuttle means and vacuum supply pipes connecting the vacuum holder to the vacuum source necessarily are movable with the glass sheet holder. The connecting frame members, through which the holder is connected to shuttle means and the vacuum supply pipes connecting the vacuum holder to a vacuum source, extend through the side walls of the enclosed heating furnace. Therefore, the furnace walls must be provided with elongated slots to permit movement of connecting means members such as the connecting frame members and the vacuum supply pipes to the holder supported by the shuttle. An elongated opening along the length of the side wall equal in length to the distance that must be traveled by the shuttle leaves a large space through which hot air can escape.

The prior art lacks means to seal the entire length of such an elongated opening to prevent loss of furnace heat through the opening and also open locally for only the minimum space and time needed to allow each connecting means member to pass through each local portion of the elongated opening and to reseal the local open portion when said connecting frame member and/or vacuum supply line passes said local portion.

PATENTS OF INTEREST

U.S. Pat. No. 3,934,970 to McMaster et al. and U.S. Pat. No. 4,725,300 to McMaster show typical examples of sealing the ends of the conveyor rolls that extend through a housing for a heating chamber to reduce the rate of heat flow out of the heating chamber.

U.S. Pat. No. 4,407,650 to Greenler discloses a ceramic seal member for a furnace exit. The seal member comprises a roll having rounded ends and an intermediate section including an outer surface having a partially circular surface portion and a flat surface portion. Rotation of the seal member so constructed brings the flat portion different distances from the upper supporting surface defined by the conveyor rolls of a furnace. Thus, rotation of the seal member adjusts the thickness of the opening so as to control the amount of heat that can escape from the exit of the furnace adjacent the rotatable seal member.

U.S. Pat. No. 4,620,864 to McMaster discloses air locks having upper and lower sets of compressible rolls sealingly disposed in at least one of the air locks so that flat glass sheets passing between the rolls completely close the opening at the air lock when glass is being conveyed through the opening or exit of the air lock. In another embodiment of this patent, doors are associated with the entrance and exit opening of at least one of the air locks. When the doors are opened and closed in an alternating manner, the heat loss and the loss of hot air from the furnace is reduced compared to when both entrance and exit doors are opened simultaneously.

U.S. Pat. No. 4,666,492 to Thimons et al. discloses a glass sheet treatment apparatus in which glass sheets are shaped to complicated shapes and tempered comprising a vacuum pickup which is attached to a shuttle frame that has its movement controlled from outside the furnace. Connecting frame members of the frame vacuum supply pipes extend through openings in the wall of the furnace to support the shuttle frame and the vacuum holder and move along the horizontally extending openings as the vacuum holder moves from a pickup station to a forming station.

The glass shaping and tempering art at the time of this invention required an improved technique for avoiding loss of furnace heat through these elongated horizontally extending openings along which the connecting frame members and vacuum supply pipes moved during movement of the vacuum holder and its supporting shuttle frame. The art required a device that would maintain the elongated horizontal openings through the walls of the furnace closed to minimize the escape of hot air from the furnace to the outside atmosphere and yet to open in local portions only to allow the connecting frame members and vacuum supply pipes to pass along the length of these openings and then to return to their closed positions to maintain the elongated horizontally extending openings in the side walls sealed when the members and pipes have passed at successive portions along the length of the wall as the shuttle mechanism moves between a vacuum pickup station and a glass sheet transfer station where the glass is transferred beyond the furnace to a shaping device.

A BRIEF DESCRIPTION OF THE INVENTION

The present invention provides means to seal each elongated opening in the side walls of the furnace by using flexible, elongated springs of steel or other heat resisting material that are closely wound and spaced close together and located closely adjacent to the outer surface of the side wall to extend across the width of the elongated opening. Each spring, in turn, is sufficiently resilient to deform in response to engagement by connecting means members comprising each moving frame member and each moving vacuum supply pipe. As each spring, in turn, is deformed by the engagement, a local portion of the sealed opening normally occupied by said flexible elongated spring in its undeflected state is temporarily opened to be replaced temporarily by a connecting means member that temporarily reseals at least a portion of said local portion. When the connecting means member passes beyond said spring, the latter returns to its undeflected state to resume its normal position of sealing the local portion of said elongated opening.

A preferred embodiment of this invention comprises a horizontally extending elongated opening provided with two opposing sets of springs, each set having one or more horizontal rows of vertically extending springs extending downwardly toward the center line of the elongated opening, opposing one or more horizontal rows of vertically extending springs extending upwardly, each upwardly extending spring in alignment with a corresponding downwardly extending spring. The springs in each row terminate with their free ends closely adjacent to a corresponding vertically aligned elongated spring. Each connecting means member engages at least one spring of each set in sequence and distorts several springs in each set before disengaging from the springs. This construction assures that only a small portion of the elongated opening remains unsealed as the furnace is operated.

The benefits of these features will be understood when the reader has had an opportunity to review a description of a preferred embodiment that follows.

DESCRIPTION OF THE PREFERRED EMBODIMENT

Figure 1:
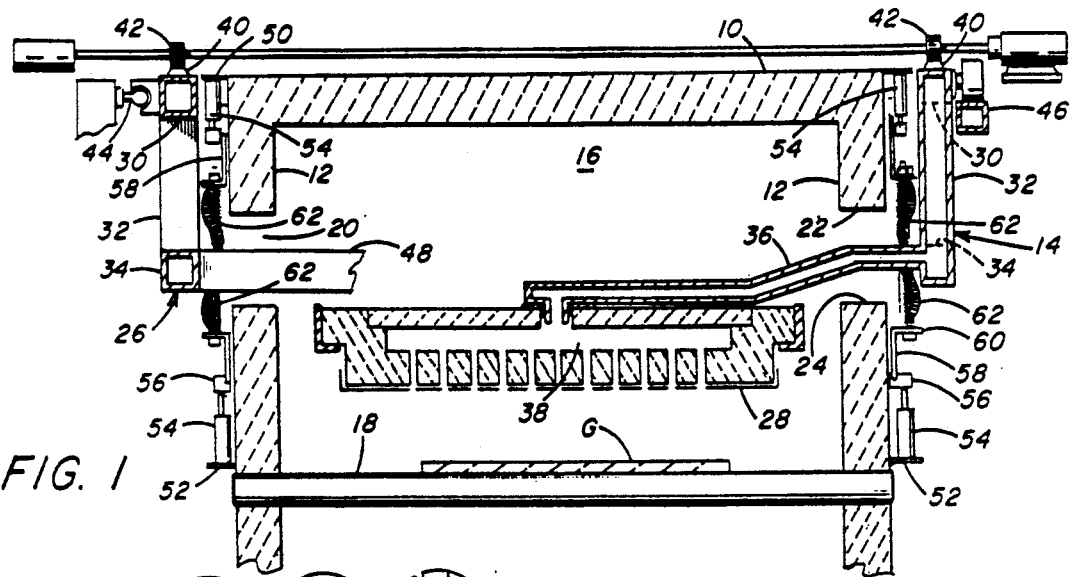
FIG. 1 is a cross section of a heated chamber showing how closely spaced springs are constructed and arranged along furnace sidewalls adjacent the elongated openings to seal the elongated openings along each sidewall of a heating chamber.

FIG. 1 shows a typical apparatus in which the present invention may be employed. This apparatus incorporates features of U.S. Pat. No. 4,666,492 to Thimons et al., the disclosure of which is incorporated herein by reference. However, this invention may be used in any furnace structure wherein elongated openings are required to provide clearance for moving connecting means members connecting a glass treatment apparatus movable within the furnace to movement imparting means and/or other control means such as vacuum control means that are preferably disposed outside the furnace walls in order to facilitate maintenance and repair, if necessary.

The gist of this invention to be described more precisely hereinafter refers to flexible spring means located closely adjacent each elongated opening in the furnace walls to seal said opening and capable of being deflected when engaged by one of the connecting means members extending through the opening which at least partially seals a local portion of the opening. Each spring in turn resumes a position in closely spaced relation covering a local portion of said opening when the connecting means member has passed thereby during movement of the movable element within the furnace.

FIG. 1 shows a cross-section of an elongated furnace 10 provided with side walls 12 enclosing a retrieval/positioning system 14 disposed in a chamber 16 near the exit end of the furnace 10. The furnace 10 contains horizontally disposed conveyor rolls 18 (only one shown) for conveying glass sheets G into chamber 16 of furnace 10 that contains the retrieval/positioning system 14. Since the portions of the apparatus including the details of the retrieval/positioning system 14 are well known in the art and do not form part of this invention, the description that follows will concentrate on the portion of the furnace 10 that has been modified by this invention.

At the chamber 16, each side wall 12 is provided with an elongated, horizontally extending opening 20 having an upper edge wall 22 and a lower edge wall 24. A shuttle frame 26 supports a vacuum platen pickup 28 and moves the pickup 28 from between chamber 16 within the furnace 10 to another position outside the furnace 10, e.g., a glass sheet shaping station (not shown) adjacent the exit end of the furnace 10. The shuttle frame 26 includes a pair of hollow longitudinal support beams 30 that connect a vacuum source (not shown) through vertical hollow connecting arms 32, horizontal hollow connecting beams 34, and horizontal hollow connecting arms 36 (only one shown in FIG. 1) to a vacuum chamber 38 within vacuum platen pickup 28. The shuttle frame 26 also contains longitudinal drive racks 40 driven by rotatable gears 42 to move the shuttle frame 26 lengthwise of chamber 16 in a manner depicted in the aforesaid U.S. Pat. No. 4,666,492. Guide 44 and support beam 46 direct the movement of the frame 26 as it moves the vacuum platen pickup 28. Cross braces 48 (one only shown in FIG. 1) extend from beams 34 through openings 20 to support the pickup 28 and reinforce the shuttle frame 26. It is necessary to provide the elongated openings 20 to enable the vacuum platen pickup 28 to move with shuttle frame 26 relative to the chamber 16. If these elongated horizontal openings 20 were not provided, it would be impossible to move connecting means members, such as cross braces 46 and the hollow connecting arms 36 that interconnect movable shuttle frame 26 outside the furnace 10 to vacuum platen pickup 28 within the furnace 10 along the opening 20 so as to move the pickup 28. These elongated horizontal openings 20 provide a source of heat loss from the furnace 10 to the surrounding environment.

The present invention provides novel means to seal the elongated openings 20 so as to reduce the heat loss. The means that are used according to this invention are deformed locally when engaged by either the cross braces or the hollow connecting arms when the latter move along an adjacent portion of the elongated opening 20 and immediately resume an undeflected state immediately adjacent said portion of the elongated opening 20 so as to reseal the local portion of the opening as quickly as possible when either a cross brace 46 or a hollow connecting arms 36 passes locally beyond the portion as the vacuum platen pickup 28 moves with its supported glass sheet G within the furnace 10 during a portion of the heat treating operation to which glass sheets G are subjected. It is understood that while the specific embodiment contemplates the vacuum platen 28 being moved with its shuttle frame 26 in a horizontal direction, it can be moved in any given direction. In such a case, the length of the elongated horizontal opening would be generally parallel to the path of movement taken by connecting means members between the vacuum platen pickup 28 and its supporting shuttle frame 26.

In the specific embodiment illustrated in FIGS. 1 and 2, the outer surface of each side wall 12 having an elongated opening 20 is provided with spring support means comprising an upper support bracket 50 above upper edge wall 22 and a lower support bracket 52 below lower edge wall 24. Each of the support brackets 50 and 52 support the housing of a piston means 54. At the outer end of the piston rod for each piston 54, a clevis attachment 56 is provided to connect the piston rod to an angular plate structure 58. The latter is provided with a clearance notch at each end and an essentially horizontal apertured flange 60 at its distal end relative to its associated piston 54. Flexible sealing members preferably but not limited to an upper set and a lower set of a plurality of elongated springs 62 are attached to the horizontal apertured flanges 60 with free ends of springs 62 of each set opposing corresponding free ends of the other set in a manner to be described later. Each plate structure 58 is provided with a pair of horizontally spaced bearing brackets 64 which receives a cross-shaft 66 having gears 68 fixed at its ends. Vertical racks 70 are fixed to the outer surface of the walls 12 in position to be engaged by gears 68 along the clearance notches of vertical plate structure 58 so as to permit the upper and lower sets of springs 62 to move in response to extension or retraction of the corresponding rod attached to each piston 54. The opposite ends of each cross-shaft 66 move vertically at equal distances thanks to gears 68 engaging vertical racks 70 in response to actuation of a corresponding piston rod.

Figure 3:
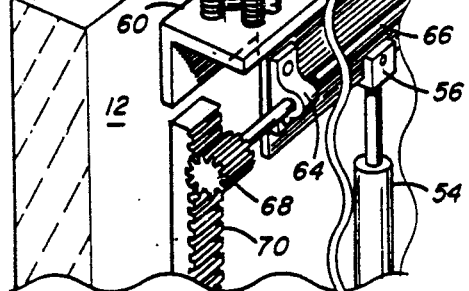
FIG. 3 is a further enlarged isometric view showing a portion of a set of springs comprising two rows of closely spaced springs supported from a flange of an angle iron support member of the movable support means of FIG. 2.
Figure 4:
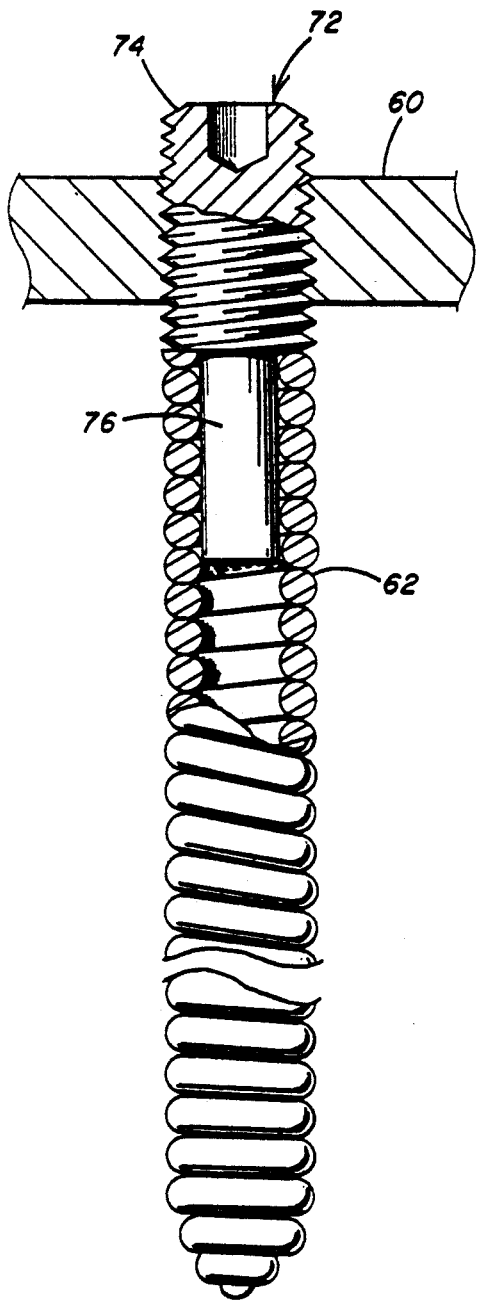
FIG. 4 is a further enlarged fragmentary view of a spring and a set screw holding the spring to the flange of FIG. 3.

Referring to FIGS. 3 and 4, each spring 62 is fixed in position relative to an aperture along horizontal apertured flange 60 by a set screw 72, which includes a relatively thick head portion 74 externally threaded to engage an internally threaded aperture through the thickness of the horizontal apertured flange 60 and a relatively thin spring engaging portion 76 (shown only in FIG. 4) extending away from the head portion 74. It is understood that the springs 62 are rigidly secured to the horizontal flanges 60 by threaded engagement of each spring engaging portion 76 with a corresponding spring 62.

Figure 5:
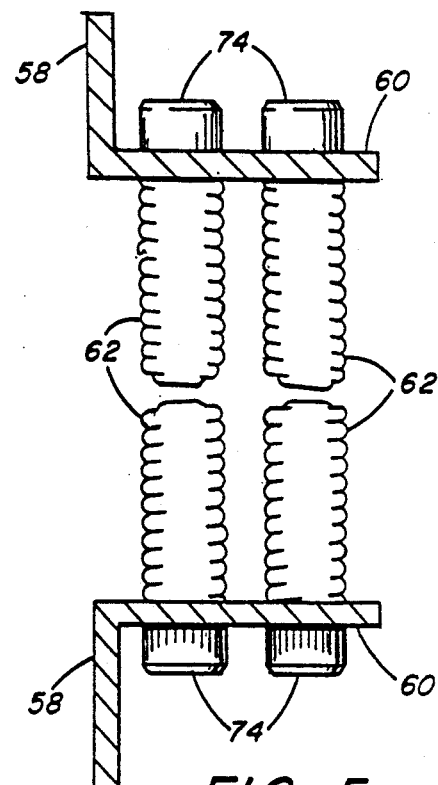
FIG. 5 is a fragmentary sectional view transverse to FIG. 4 showing two sets of springs in their closed position.

It is preferred, but not necessary, that the springs 62 extend toward one another in such a manner that, in their closed positions with the piston rods extended, they approach each other to within a space preferably not exceeding 0.25 inch (0.64 cm) between the free ends of the upper and lower sets of springs 62. The springs 62 are closely spaced along rows, and as an example, have an outer diameter of approximately 0.410 inches (1.04 cm) and are space center-to-center about 7/16-inch (1.11 cm) along each row to provide only a small space between adjacent springs. Preferably, but not necessarily, each set of springs 62 extends through flanges 60 along two rows with the centers of the springs in each row being staggered relative to the centers of the springs in the other row, as depicted in FIGS. 3 and 5. The rows are transversely spaced about a 1 inch (2.54 cm) center from each other in each set.

Figure 2:
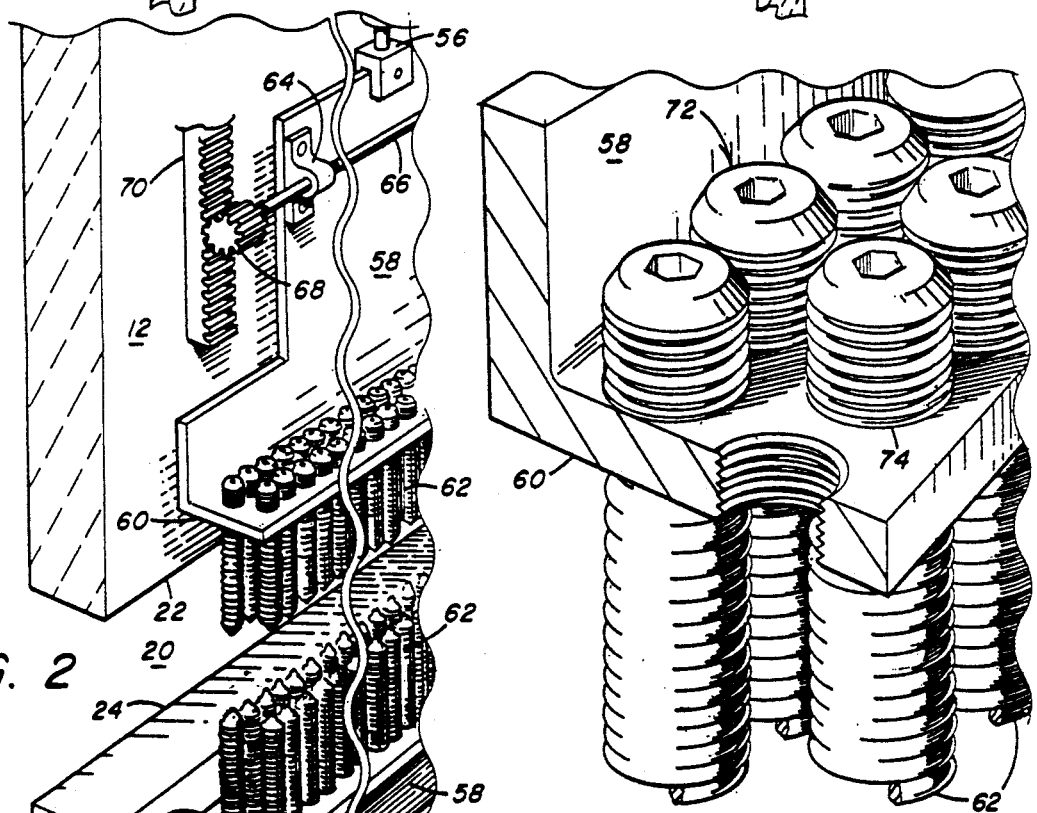
FIG. 2 is a large isometric view of the outer surface of a portion of one of the sidewalls showing means movably supporting a pair of sets of springs along said sidewall.

In FIG. 2 the lower set of springs 62 is shown raised to the highest possible closed position, while the upper set of springs is shown partly retracted so as to enable the upper half of the longitudinally extending opening 20 to be unobstructed. It is understood, however, that both the upper and lower sets of springs 62 are usually either extended towards one another to seal elongated opening 20 as is the case when the apparatus is operating to seal opening 20 or retracted from one another when it is necessary to obtain access to the interior of the portion of the furnace 10 containing the retrieval/positioning system 14. The end of each spring 62 is smoothed to avoid friction on the traveling vacuum pipes 36 or cross members 46 that extend through the elongated opening 20.

While it is preferred that the springs 62 in their undistorted state extend substantially 6 to 8 inches (15.24 to 20.32 cm) almost to the mid-line of the elongated opening 20, so the members moving through the opening 20 provide equal distorting force against the upper and lower elongated springs 62, this central location of the space between the sets of springs is not absolutely necessary. Furthermore, while FIGS. 2 to 5 show two rows of springs 62 in each set of springs, with the rows being separated transversely by approximately one inch centers and the springs in each row separated longitudinally by 7/16-inch (1.11 cm) centers, a single row of springs for either the upper or the lower set of springs or both sets as in FIG. 1 may be sufficient to provide sufficient closure. Furthermore, the dimensions mentioned are exemplary only and may be modified as needed.

Figure 6:
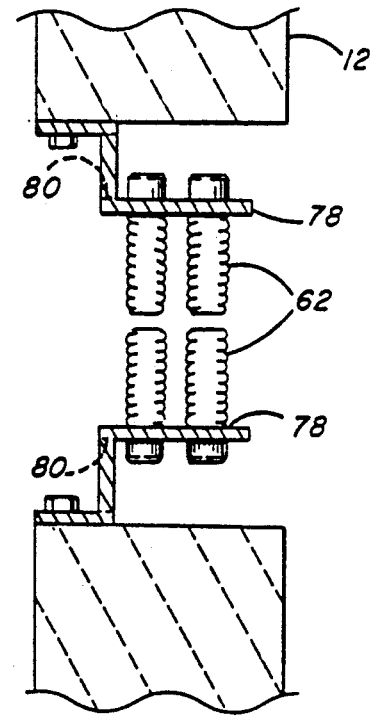
FIG. 6 is a cross-sectional view of an alternate embodiment of the invention.

Although the preferred embodiment of the invention positions the springs 62 outside the furnace 10 adjacent openings 20, it would be obvious, based on the teaching of this disclosure, to position the springs 62 along side walls 12 within the furnace 10, or position the springs 62 within opening 20. More particularly, referring to FIG. 6, the springs 62 may be secured to angles 78, which are bolted in place within elongated opening 20. Openings 80 within the angles 78 allow for limited access to head portion 74 of set screw 72 to adjust the height of each spring 62. Insulating material (not shown) may be positioned to seal openings 80 during operation of the furnace.

When vacuum platen pickup 28 moves within the chamber 16, the connecting means members such as cross braces 48 and transverse hollow connecting arms 36 engage and cause successive springs 62 to distort in the direction of movement of the vacuum platen pickup 28 and tend to open the seal in the local portion of the engagement and to be at least partially replaced temporarily by the connecting means members as a seal for the local portion of opening 20. Immediately upon passing, each spring 62 resumes its normal undeflected state and reseals as much of the local portion of elongated opening 20 as quickly as possible. The number of rows of springs 62 in each set can be increased or decreased, as desired. However, it has been found that two rows of springs for the upper set and two rows of springs for the lower set, with the rows being offset from one another, as shown in FIGS. 2 to 5, provides adequate sealing results to reduce exposure of the atmosphere surrounding the furnace 10 from heat loss through the elongated opening.

It is also understood that while the preferred embodiment of this invention includes an upper set of springs and a lower set of springs, the present invention also contemplates a furnace sealing system in which a single set of springs is used. The springs in such a set have to extend across the complete width of the opening 20 and may include one or more rows of closely spaced springs.

The forms of the invention shown and described in this disclosure represent illustrative preferred embodiments thereof. It is understood that the gist of this invention as defined in the claimed subject matter which follows includes modifications of this invention which become obvious in light of the description contained in this specification and that such obvious modifications are incorporated in the subject matter for which the applicants seek protection.

What is claimed is:

1. In a glass sheet treating furnace of the type having a chamber, said chamber having an entrance end, an exit end and a slot through at least one wall portion and extending between the entrance and exit ends, a glass sheet handling device mounted within said chamber, a support member extending through the slot and connected to the handling device, moving means mounted outside the chamber and acting on said support member to move said support member and said handling device between the entrance and exit ends of the chamber along a sheet movement path, wherein the improvement comprises:

a plurality of discrete elongated springs each having a longitudinal axis; and means for mounting said plurality of springs relative to said slot such that the longitudinal axes of said plurality of springs lie in a plane transverse to a plane containing the sheet movement path and parallel to the sheet movement path wherein the springs when in a non-working position have their longitudinal axis transverse to the direction of the sheet movement path and overly the slot and in a working position have their longitudinal axis bent toward said entrance end or said exit end of the chamber to provide a barrier to limit movement of atmosphere between the inside and outside of the chamber through said slot and to maintain the barrier as said support member is moved along said sheet movement path.

2. The glass sheet treating furnace as in claim 1 wherein said chamber is an elongated chamber, said slot is an elongated slot, said mounting means includes a spring support means located proximate to said elongated slot and said plurality of elongated springs are characterized by individual springs each having one end that is free to move at least toward and away from the ends of said chamber, and another end being mounted on said spring support means.

3. The glass sheet treating furnace as in claim 2 wherein said plurality of elongated springs comprise at least one set of closely spaced springs mounted on said spring support means and further including means to displace said spring support member relative to said elongated slot between a closed position where said free ends of said at least one set of springs in said non-working position overlay said slot and a recessed position where said free ends are spaced from said slot to facilitate access to within said chamber through said slot.

4. The glass sheet treating furnace as in claim 2 wherein said plurality of springs comprises a first longitudinally extending row of closely adjacent springs and a second longitudinally extending row of closely adjacent springs with said first row being offset longitudinally with respect to the adjacent springs of said second row.

5. The glass sheet treating furnace as in claim 2 wherein said chamber has a pair of side walls, each of said side walls is provided with an elongated slot extending horizontally in a common horizontal plane and each of said elongated slots is provided with said plurality of elongated springs to provide a barrier limiting movement of the atmosphere between the inside and outside of said chamber through said slots and to maintain said barrier as said support member is moved along said sheet movement path.

6. The glass sheet treating furnace as in claim 2 wherein said plurality of springs is a first set of springs, said spring support means is a first spring support means and further including a second set of springs including a plurality of elongated individual springs having free ends and mounted ends, said mounted ends being mounted on a second spring support means, said first and second spring support means mounted spaced from one another about said slot with the free ends of said second set of springs facing the free ends of said first set of springs when in the non-working position.

7. The glass sheet treating furnace as in claim 2 wherein said slot is a first slot, said chamber having a pair of opposed side walls, said first slot in one of said side walls and a second slot in said opposite side wall aligned with said first slot; said plurality of springs is a first set of springs, said spring support means is a first spring support means and further includes:

second, third and fourth spring support means;

three sets of springs defined as second, third and fourth set of springs, said second, third and fourth sets each include a plurality of elongated individual springs having free ends and mounted ends, said mounted ends being mounted on said second, third and fourth spring support means, respectively;

said first and second spring support means mounted spaced from one another about said first slot with the free ends of said second set of springs facing the free ends of said first set of springs when in the non-working position;

said third and fourth spring support means mounted spaced from one another about said second slot with longitudinal axis of said third and fourth set of springs lying in a plane parallel to the plane containing said first set of springs, and with the free ends of said third and fourth set of springs facing one another;

wherein said springs in the non-working position each have their longitudinal axis transverse to the sheet movement and in the non-working position have their longitudinal axis bent toward either said entrance end or said exit end.

8. The glass sheet treating furnace as in claim 7 wherein each of said spring support means are positioned external to said chamber.

9. The glass sheet treating furnace as in claim 8 wherein said glass sheet handling device is a vacuum platen, said moving means is a shuttle means, said support member being at least one transversely extending reinforcing member and further including a means for providing a vacuum path between a vacuum source and said vacuum platen.

10. The glass sheet treating furnace as in claim 8 wherein said support member extends through said first slot and further including:
a second support member extending through said second slot and connected to said vacuum platen;
means to heat the furnace interior;
said first, second, third and fourth sets of springs each include a first longitudinally extending row of closely adjacent springs and a second longitudinally extending row of closely adjacent springs with said first row being offset longitudinally with respect to the adjacent springs of said second set; and
means for moving said free ends of said first and second sets of springs and said free ends of said third and fourth sets of springs toward and away from one another about their respective slots.

11. The glass sheet treating furnace as in claim 7 wherein each of said spring support means are positioned within said elongated slot.

12. In a method of heating a glass sheet in a furnace of the type having a chamber, said chamber having an entrance end and an exit end and a slot through at least one wall portion, said slot extending between the exit and entrance ends, a glass sheet handling device mounted in the chamber and a support member extending through the slot engaging the handling device; the method includes the steps of supporting a sheet by the handling device, acting on the support member to move the handling device and sheet through the furnace along a sheet movement path between the exit and entrance ends of the furnace while heating the sheet, wherein heat from inside the furnace passes through the slot, wherein the improvement comprises:

mounting a plurality of discrete elongated springs each having a longitudinal axis such that the longitudinal axis of the springs in a non-working position overlies the slot, and lies in a plane transverse to a plane containing the sheet movement path and parallel to the sheet movement path and the springs in a working position are bent toward an end of the furnace; and moving the handling device to move the sheet through the furnace wherein the handling device as it moves over the springs moves them toward the working position and as it passes over the springs allows them to move to the non-working position to maintain a barrier limiting movement of atmosphere between the inside and outside of said furnace chamber.

13. The method as set forth in claim 12 wherein said slot is a first slot, and at least one wall portion is a pair of spaced wall portions, with said first slot in one of the wall portions, and the furnace further includes a second elongated slot in the other wall portion extending between the ends of the furnace and a handling device extending through the second slot, further including the step of practicing said mounting step and said moving step at the second slot.

14. The method as set forth in claim 13 wherein the wall portions are vertical walls and said mounting steps are practiced at the first and second slots to position elongated springs to extend upwardly over the slot, said mounting step being further practiced at the first and second slots to position elongated springs to extend downwardly over the slot so that the slots are covered when the springs are in the non-working position.

* * * * *